(12) United States Patent
Liang et al.

(10) Patent No.: US 6,333,974 B1
(45) Date of Patent: Dec. 25, 2001

(54) DETECTION OF A CALL-WAITING TONE BY A MODEM

(75) Inventors: Haixiang Liang, Santa Clara; Zarko Draganic, Menlo Park, both of CA (US)

(73) Assignee: AltoCom, Inc., Irvine, CA (US)

( * ) Notice: Subject to any disclaimer, the term of this patent is extended or adjusted under 35 U.S.C. 154(b) by 0 days.

(21) Appl. No.: 09/084,674

(22) Filed: May 26, 1998

(51) Int. Cl.[7] .................................................. H04M 11/00
(52) U.S. Cl. .................................. 379/93.35; 379/215.01
(58) Field of Search ........................... 379/93.35, 215.01, 379/406.01, 406.02, 93.09, 93.11, 93.17, 93.23, 93.28, 93.31; 375/222

(56) References Cited

U.S. PATENT DOCUMENTS

| | | | |
|---|---|---|---|
| 4,852,151 | 7/1989 | Dittakavi et al. | 379/97 |
| 4,995,074 | 2/1991 | Goldman et al. | 379/97 |
| 5,287,401 | 2/1994 | Lin | 379/98 |
| 5,513,251 | 4/1996 | Rochkind et al. | 379/93 |
| 5,550,908 | 8/1996 | Cai et al. | 379/215 |
| 5,651,060 | 7/1997 | Cohn et al. | 379/215 |
| 6,067,353 | * 5/2000 | Szeliga | 379/93.35 |
| 6,118,857 | * 9/2000 | Terschluse | 379/93.35 |

OTHER PUBLICATIONS

ITU–T Recommendation V.34, A Modem Operating at Data Signalling Rates of up to 28 800 bits/s for Use on the General Switched Telephone Network and on Leased Point-–to–Point 2–Wire Telephone–Type Circuits, 09/94 (previously CCITT Recommendation).

\* cited by examiner

*Primary Examiner*—Stella Woo
(74) *Attorney, Agent, or Firm*—Zagorin, O'Brien & Graham, LLP

(57) ABSTRACT

Reliable detection of a call-waiting tone is provided by employing a correlation based technique. A modem or other device employing such a technique need not rely on carrier drop detection and is generally insensitive to other energy or noise on the line.

40 Claims, 4 Drawing Sheets

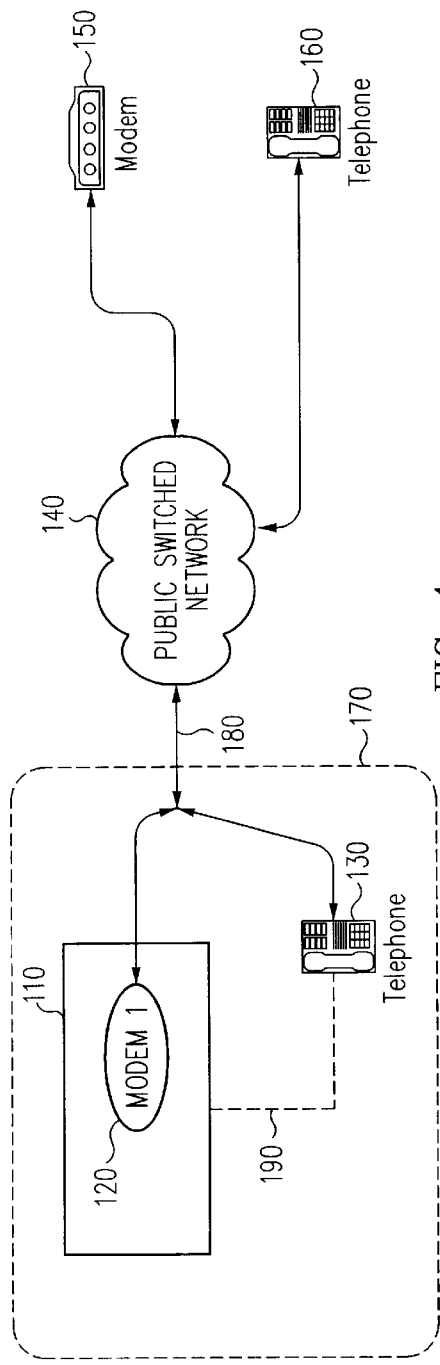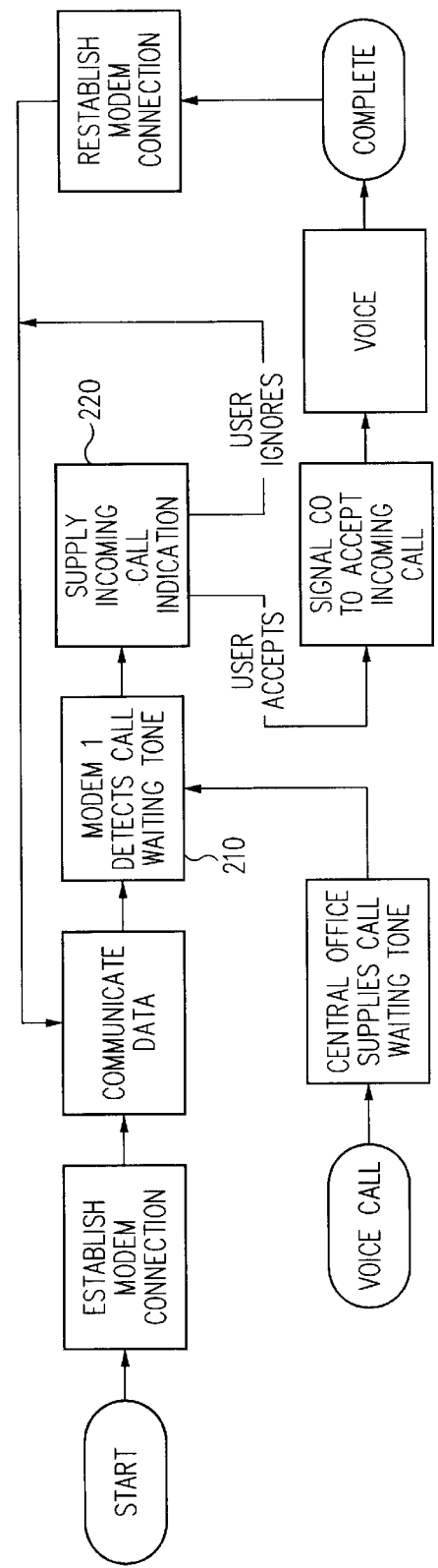
FIG. 1
FIG. 2

DETECTION OF A CALL-WAITING TONE BY A MODEM

BACKGROUND OF THE INVENTION

1. Field of the Invention

This invention relates to modems, and in particular to systems and methods for detecting call-waiting tones during modem connection.

2. Description of the Related Art

Modems are communications devices which employ digital modulation techniques to transmit binary data over analog communications channels, e.g., telephone lines. Typically, two modems communicate over a single channel, with one modem at each end of the channel. Signal processing structures implemented at each modem provide encoding, modulation, filtering, interpolation, echo cancellation, signal detection, equalization, demodulation, and decoding functions. Modems typically conform to international standards to ensure interoperability with modems from other manufacturers. One such standard is the V.34 specification described in ITU-T Recommendation V.34, A Modem Operating at Data Signalling Rates of up to 28 800 bits/s for Use on the General Switched Telephone Network and on Leased Point-to-Point 2-Wire Telephone-Type Circuits, dated September, 1994 (previously CCITT Recommendation V.34), which is hereby incorporated herein, in its entirety, by reference.

Traditional modem implementations include one or more dedicated digital signal processors (or DSPs) on which signal processing algorithms execute during periods of modem operation. A computer system may incorporate such a modem implementation, and in addition, typically includes application and operating system software executable on a general purpose processor. Software executing on the general purpose processor sends and receives data via the modem implementation using input/output (I/O) ports, direct memory access (DMA), or other I/O structures and methods suitable for a particular general purpose processor and operating system combination.

Since a typical modem implementation includes a dedicated DSP not shared with other signal processing functions of a larger computer system, the modem's DSP and the signal processing algorithms designed to run thereon are selected and designed to meet the peak computation load of the modem. DSP cycles are either used or lost. For this reason, signal processing algorithms implementing the complete steady-state functionality of modem transmit and receive paths are typically executed on a DSP at full speed for the duration of a modem connection.

For many portable device applications such as Personal Digital Assistants (PDAs), portable computers, and cellular phones, power consumption, battery life, and overall mass are important design figures of merit. In addition, very small part counts are desirable for extremely-small, low-cost consumer devices. Modem communications are desirable in many such portable device applications. However, traditional DSP implementations of the underlying signal processing capabilities create substantial power demands, require increased part counts, and because of the power consumption of a discrete DSP, typically require larger heavier batteries.

A modem implemented as software executable on a general purpose computer may reduce part count, power demands, and overall size and mass of a computer system by eliminating the DSP, its power consumption, and some of the battery capacity otherwise required. Even non-portable device applications such as set top boxes (e.g., WebTV™ internet terminal devices or satellite/pay TV authorization devices), fax machines, etc. may benefit from the reduced part count, low cost, and reduced size and mass benefits of a software modem.

Many of these devices, whether or not portable, will be connected to the public switched telephone network on a single telephone line shared for voice communications. Such a configuration, which is typical in a residential service setting, may tie up the single phone line for extended periods of time during which the modem is communicating over the line. During such time, incoming callers may receive a busy signal.

A call waiting feature offered by many local exchange carriers alerts a person using a telephone for conventional voice communication that a third party is attempting to call the user while the user is still making a call. In such a system, the called party is notified and has the option to interrupt the ongoing call to take the waiting call. Typically, the local exchange carrier provides the call waiting feature by providing a call waiting tone of 440 Hz on the telephone line. The user typically hears the tone and may accept the waiting call by depressing, or "flashing" the switch hook.

Features such as the call waiting feature, while convenient, present problems when the initial call includes a modem data communications session. For example, when a modem is used, the call waiting signal is typically not recognized by the modem because the modem is not adapted to recognize the call waiting signal during data communications. As a result, "waiting calls" may go unanswered. This is particularly problematic in single-line residential settings where a phone subscriber may miss incoming calls when, for example, an internet terminal device is downloading data associated with a universal resource locator (URL) or a satellite/pay TV authorization device is using the phone line to transact a pay-per-view charge. Additionally, the call waiting signal can disrupt the modem communications session and cause its premature termination.

A prior art method of call waiting signal detection for a modem is disclosed in U.S. Pat. No. 4,852,151, issued Jul. 25, 1989, and entitled MODEM WITH CALL WAITING. The disclosed modem includes a data mode filter that is adapted to detect the presence of the carrier signal during the data transfer operation of the modem (i.e., the data mode), and a call progress management filter to detect incoming signals during the modem's call connection operation (i.e., the call progress mode.) The call waiting signal is typically not within the bandwidth of the data mode filter, but the call waiting signal is typically within the bandwidth of the call progress management filter. The method disclosed in the '151 patent switches the data mode filter to the call progress management filter once the data mode filter detects a loss of the carrier signal. If the call progress management filter then detects energy in its bandwidth, the call waiting signal has been detected.

Another prior art method of call waiting signal detection for a modem is disclosed in U.S. Pat. No. 5,287,401, issued Feb. 15, 1994, and entitled APPARATUS AND METHOD FOR A MODEM FOR DETECTING A CALL WAITING SIGNAL. The disclosed modem detects a cadence of carrier loss, carrier re-detect, carrier loss that is characteristic of local exchange carrier supply of call waiting tones. If the characteristic carrier loss/carrier detect cadence is detected, then the modem switches to its call progress management (CPM) filter. If the CPM filter then detects energy in its bandwidth, the call waiting signal has been detected.

Unfortunately, carrier loss can and does occur for reasons other than supply of call waiting tones. For example, carrier can be temporarily lost due to telephone line transmission problems. If the data mode filters are switched off because of a carrier loss or a cadence not generated by a call waiting tone, subsequent data in a returning carrier signal would not be detected. Furthermore, each of the above prior-art methods relies on energy detected in the CPM filter band and is not specific to the 440 Hz call waiting tone. Thus, noise in the CPM filter band may trigger an errant call waiting detection.

Another method of call waiting signal detection for a modem has been employed in at least some versions of WebTV™ set top boxes. The method, referred to as "Line-Share" in WebTV™ documentation is to monitor the signal-to-noise-ratio (SNR) of a modem connection, and when the SNR drops significantly for a period of time, a call-waiting tone is assumed to have caused the reduced SNR. Unfortunately, many other conditions can cause reduced SNR, so call-waiting tone detection may be unreliable.

SUMMARY OF THE INVENTION

It has been discovered that reliable detection of a call-waiting tone can be provided by employing a correlation based technique disclosed herein. A modem employing such a technique need not rely on carrier drop detection and is generally insensitve to other energy or noise on the line.

In one embodiment in accordance with the present invention, a method of detecting a call-waiting tone in a signal includes sampling the signal to form a first sequence including signal samples, cross-correlating the first sequence with a second sequence to form a first cross-correlation value, and cross-correlating the first sequence with a third sequence to form a second cross-correlation value. The second sequence is derived from the first sequence and is temporally displaced by a first lag therefrom. The third sequence is derived from the first sequence and is temporally displaced by a second lag therefrom. A call-waiting tone is identified in the signal by comparing the first cross-correlation value with a first threshold percentage of a signal power value for the first sequence and by comparing the second cross-correlation value with a second threshold percentage of the signal power value. First and second threshold percentages may be the same or different percentages.

In another embodiment in accordance with the present invention, an apparatus includes a signal sampler and a call-waiting tone detector. The signal sampler is coupled to receive a signal from a communications medium and to form a sampled sequence of values corresponding to the signal. The call-waiting tone detector is coupled to operate on a stored representation of a first sequence corresponding to the sampled sequence, and includes a first correlator, a second correlator, a third correlator and decision logic responsive to the first, the second, and the third correlators. The first correlator has access to the stored representation to calculate a power value of the signal. The second correlator has access to the stored representation to cross-correlate the stored representation with a first temporal displacement thereof to produce a first cross-correlation value. The third correlator has access to the stored representation to cross-correlate the stored representation with a second temporal displacement thereof to produce a second cross-correlation value. The decision logic signals detection of a call-waiting tone if the power value exceeds a threshold power level, the first cross-correlation value exceeds a first threshold percentage of the power value, and the additive inverse of the second cross-correlation value exceeds a second threshold percentage of the power value. The first and second temporal displacements are each by integer numbers of samples, the first temporal displacement corresponds to an integer multiple of the period of a call-waiting tone, and the second temporal displacement corresponds to a half-integer multiple of the period of the call-waiting tone.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 1 is a block diagram depicting a communications device including a modem having a call-waiting tone detector in accordance with an embodiment of the present invention.

FIG. 2 is a flow chart depicting operation (in accordance with an embodiment of the present invention) of the communications device and modem of FIG. 1 together with other communications devices in response to detection of a call-waiting tone in a received signal.

DETAILED DESCRIPTION

Figure 3:
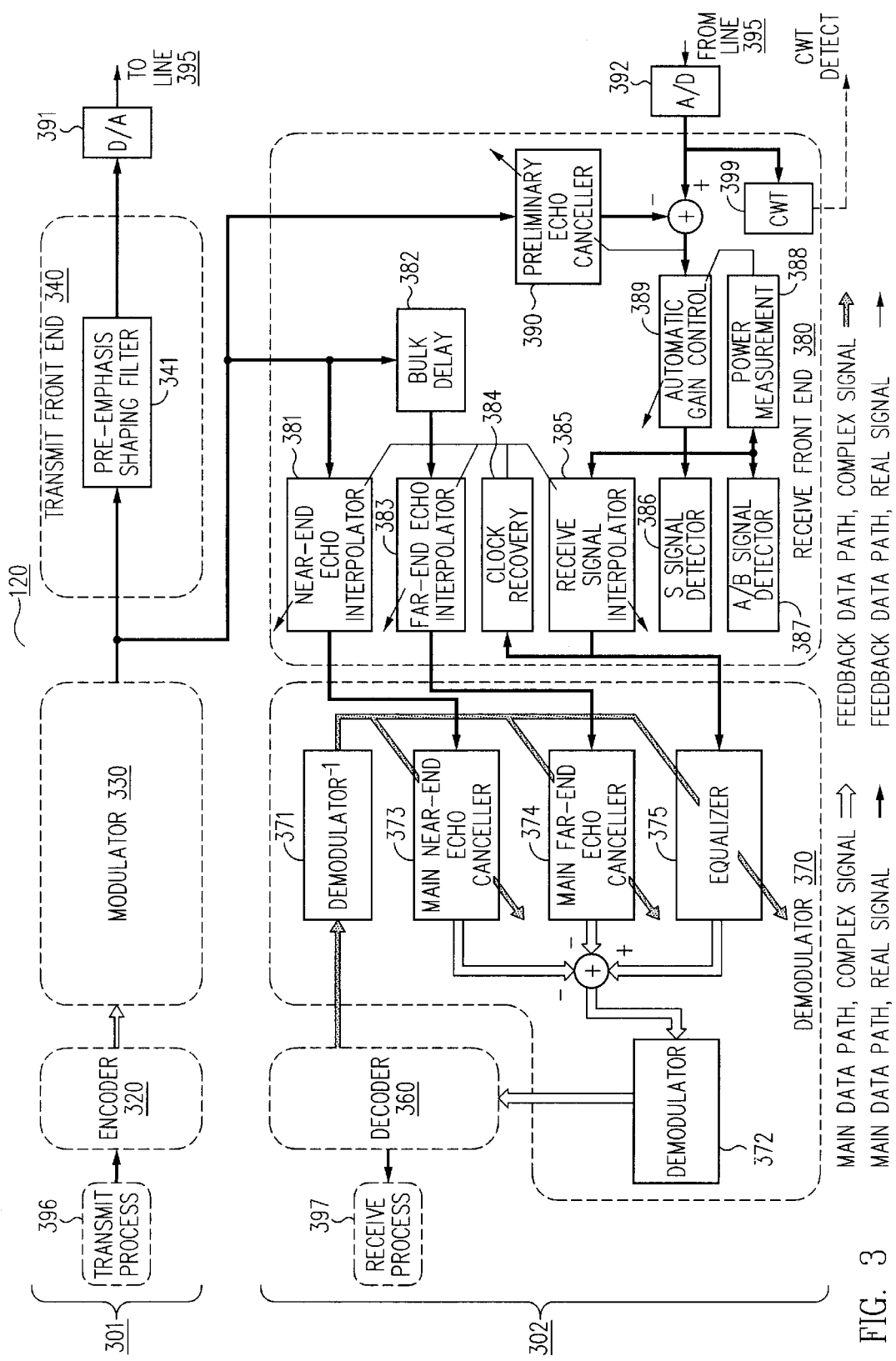
FIG. 3 is a block diagram depicting functional modules and data flows for a modem including a call-waiting tone detector in accordance with an embodiment of the present invention.

FIG. 1 depicts a communications device 110 including a modem 120 providing call-waiting tone detection in accordance with an embodiment of the present invention. In the embodiment of FIG. 1, modem 120 includes software modem code executable on a processor of communications device 110 to provide encoding, modulation, filtering, interpolation, echo cancellation, signal detection, equalization, demodulation, and decoding functions in accordance with a predetermined set of telecommunications standards, e.g., ITU-T Recommendation V.34 or V.32bis. Modem 120 is coupled to a public switched network 140 via line 180. Another telecommunications device, illustratively telephone 130, is also coupled to the public switched network 140 via line 180. Therefore, both modem 120 and telephone 130 share line 180 at premises 170.

In operation, a data communications session is initiated between modem 120 and modem 150. Like modem 120, modem 150 may be a software modem; however, modem 150 may also be a traditional hardware modem. During data communications between modems 150 and 120, yet another telecommunications device, illustratively telephone 160, may initiate a call to the number associated with line 180. Public switched network 140 supplies a call waiting tone at 440 Hz on line 180. Typically, the call-waiting tone is supplied from a central office of the local exchange carrier.

Referring to FIG. 2, modem 120 detects (210) the call waiting tone as described in greater detail below and supplies (220) an incoming call indication. Depending on the particular type of communications device 110, the incoming call indication may be provided visually, audibly, or by other means. For example, in a television set top box embodiment, the incoming call may be indicated on television screen (not shown). Alternatively, the incoming call may be signaled audibly by communications device 110, or by the ringer of telephone 130 if coupled thereto (e.g., as shown). A user may accept or ignore the incoming call. If the user ignores the incoming call, modem 120 will continue to communicate data and data lost due to interruption of carrier by the central office will be retransmitted according to an error-correction protocol after the physical layer reestablishes connection.

If the user accepts the incoming call, the central office is signaled and, in response, telephone 160 is coupled to line 180. In some embodiments, telephone 130 may be integrated with communications device 110 such that supply of the incoming call acceptance signal is provided by the combined device. In others, telephone 130 may be coupled to line 180 via communications device 110 such that a ring indication is synthesized on line 190 and such that communications device 110 generates a flash indication on line 180 and couples line 180 through to telephone 130 in response to pickup at telephone 130.

Call-Waiting Tone Detection

Whatever the method of signaling acceptance of the incoming call, modem 120 must first detect the call-waiting tone. At any time during the data communications session between modems 120 and 150, a new incoming call can be made to line 180, causing a central office of public switched network 140 to supply a call-waiting tone of 440 Hz that appears at the line input of modem 120.

FIG. 3 depicts signal processing structures of modem 120 including call-waiting tone detector 399. In the embodiment of FIG. 3, call-waiting tone detector 399 receives output of A/D converter 392 and includes bandpass filtering to limit echo. In this way operation of call-waiting tone detector 399 is independent of the current modulation scheme for modem 120.

Figure 4:
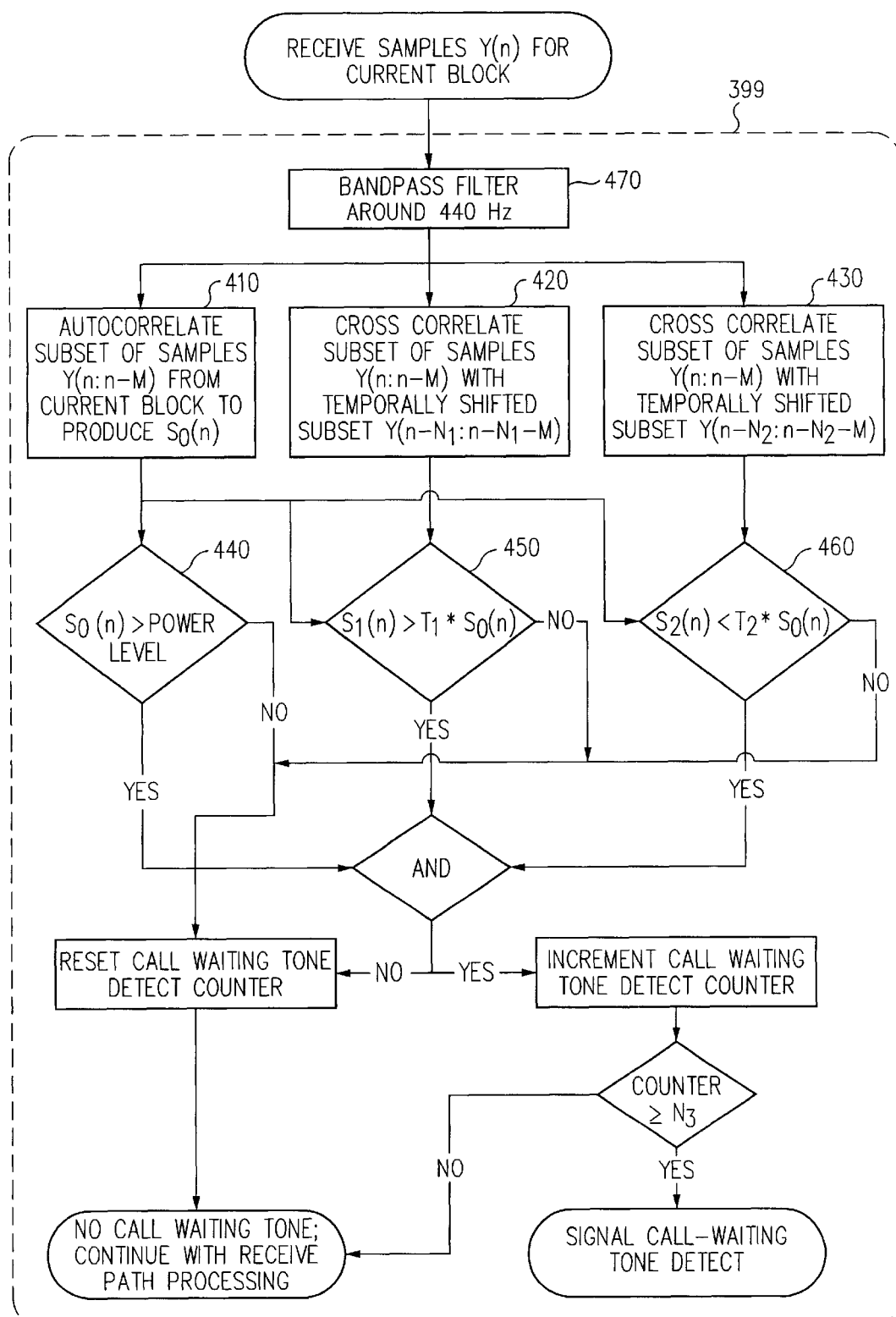
FIG. 4 is a flow chart depicting operation of the call-waiting tone detector of FIG. 3 in accordance with an embodiment of the present invention.

Operation of modem 120 is described in greater detail below. FIG. 4 depicts operation of call-waiting tone detector 399 for reliably detecting the call waiting tone in accordance with an embodiment of the present invention. Referring to FIG. 4, modem 120 receives samples Y(n) for a current block of data. Typically, a block will include 48 samples of data from line 180 although other block sizes are also suitable. Using a subset of the samples from the block, call-waiting tone detector 399 first performs bandpass filtering 470 to remove echo then performs a series of correlations 410, 420, and 430 on the bandpass filtered data.

The correlation based detection method of call-waiting tone detector 399 can be better understood as follows. For a given sampling frequency, two integer numbers $N_1$ and $N_2$ can be found such that:

$$N_1 = K_1 * P \tag{1}$$

$$N_2 = (K_2 + \tfrac{1}{2}) * P \tag{2}$$

where both $K_1$ and $K_2$ are integers and where P is the period (in samples) of the 440 Hz tone. P can be a fractional number of samples. Given the above definitions and a sampled sequence x(n) of a pure 440 Hz tone, then:

$$x(n) = x(n+N_1) \tag{3}$$

$$x(n) = -x(n+N_2) \tag{4}$$

That is, $x(n+N_1)$ represents a net $2\pi$ (or 1/440= 0.002272 second) phase shift of the sampled sequence and $x(n+N_2)$ represents a net $\pi$ (or 1/220= 0.0045 second) phase shift of the sampled sequence. Call-waiting tone detector 399 utilizes correlations of a sampled sequence y(n) for a signal on line 180 with phase shifted versions thereof (net $2\pi_{440\ Hz}$ and net $\pi_{440\ Hz}$) to detect the 440 Hz tone amongst other energy on line 180. Energy on line 180 will typically include that supplied by transmit path 301 of modem 120 as well as that transmitted by modem 150, but may include a 440 Hz call-waiting tone component.

For samples y(n) from line 180, call-waiting tone detector 399 performs the following correlations:

$$S_0(n) = \sum_{i=0}^{M-1} y(n-i)y(n-i) \tag{5}$$

$$S_1(n) = \sum_{i=0}^{M-1} y(n-i)y(n-i-N_1) \tag{6}$$

$$S_2(n) = \sum_{i=0}^{M-1} y(n-i)y(n-i-N_2) \tag{7}$$

where a subset of samples, numbering M, are used in the respective correlations. Typically, the correlations need only be performed one per block of 48 samples. Therefore, the correlations per block can be represented as:

$$S_{0,current\ block} = \sum_{i=0}^{M-1} y(i)y(i) \tag{8}$$

$$S_{1,current\ block} = \sum_{i=0}^{M-1} y(i)y(i-N_1) \tag{9}$$

$$S_{2,current\ block} = \sum_{i=0}^{M-1} y(i)y(i-N_2) \tag{10}$$

As long as M samples correspond to a period longer than that of the 440 Hz call-waiting tone, any subset of M samples from the current block is suitable.

The first correlation (i.e., equation 8, above) corresponds to auto-correlation 410 (i.e., correlation of the subset with itself) to produce a measure $S_0$ of the power level of the incoming signal. The second correlation (i.e., equation 9, above) corresponds to cross-correlation 420 (i.e., correlation of the subset with a version thereof phase shifted by $N_1$ samples or an integer multiple of the call waiting tone period) to produce a measure $S_1$. The third correlation (i.e., equation 10, above) corresponds to cross-correlation 430 (i.e., correlation of the subset with a version thereof phase shifted by $N_2$ samples or a half multiple of the call waiting tone period) to produce a measure $S_2$.

Given the above-described correlations, if $$S_0 > threshold_{power\_level}; \tag{11}$$

$$S_1 > threshold_1 * S_0; \tag{12}$$

and $$S_2 < -threshold_2 * S_0 \tag{13}$$

for some consecutive blocks $N_3$, then a 440 Hz tone is present in sampled signal y(n) and a call-waiting tone is detected by call-waiting tone detector 399. The use of both second and third crosscorrelations discriminates a sampled signal y(n) including a call-waiting tone component from a DC signal on line 180.

If $S_0$ is not greater than power threshold (decision 440), then no call-waiting tone is present. Selection of a power threshold can be better understood as follows. If line 180 (FIG. 1) has the call waiting feature enabled, when a call is made by telephone 160 to line 180 during communications between modems 120 and 150, the central office interrupts the modem 150 to modem 120 connection for 300 ms (resulting in a carrier drop) and provides a −13dBm 440 Hz call-waiting tone on line 180 (i.e., to modem 120). Typically, two instances of the call-waiting tone are supplied at a 10 second interval. As a result, receive path structures of modem 120 receive only the 440 Hz tone and the local hybrid echo (near-end echo). Since the 13dBm 440 Hz tone is supplied only on the local loop, it will be received normally around −19dBm. Bandpass filter 470 reduces the near-end echo signal level below that of the received call-waiting tone. In such case, a power threshold of −30dBm discriminates between sequences possibly including a call-waiting tone component and those certainly not including a call-waiting tone component. Power threshold values as low as −43 dBm are also suitable. The bandpass filter is used so that the call waiting detector is independent of current modem modulation scheme, e.g., V.34, V.32 or even V.22. Values for $threshold_1$ and $threshold_2$ are chosen to reflect the relative near-end echo level. Suitable values are typically in the range of 0.2 to 0.75 for configurations such as that depicted in FIG. 3.

An exemplary embodiment of call-waiting tone detector 399 includes code executable on a processor, e.g., of communications device 110, although the invention is not limited to such an embodiment. In particular, the source code which follows is functionally descriptive of various implementations in accordance with the present invention, including e.g., implementations in custom circuitry, using a programmed custom (or commercially-available) DSP, as software executable on a general purpose processor, or as any combination of the above.

```
#define   kMinDetectSensitivity   1
#define   kMinPower               1000
Public void
CallWaitingDetector(int nSamps, short *srcPtr)
    {
    if (gDetectorSensitivity != 0)
        {
        long power, corr1, corr2;
        short *srcEndPtr = srcPtr + nSamps;
        short *dstPtr = gFltDLineWritePtr;
        long temp0, temp1, temp2;
        /* IIR bandpass filter to filter out near-end echo */
        do
            {
            temp1 = (long)dstPtr[-1];
            temp2 = (long)dstPtr[-2];
            temp0 = ((long) (*srcPtr++) >> 6) + (temp1 << 1) -
                    (((temp1 << gFilterShift1) +
                      (temp1 << gFilterShift2)) >> 4) -
                    temp2 + (temp2 >> 6);
            *dstPtr++ = (short) (temp0);
            } while (srcPtr != srcEndPtr);
        BlockShortSubtract(nSamps, gFltDLineWritePtr,
                                   gFltDLineWritePtr-gFilterDelay,
                                   gDelayLineWritePtr);
        BlockShortMove(kCallWaitingFilterMaxDelay,
                       gFilterDelayLine+nSamps, gFilterDelayLine);
        /* run correlators to detect call waiting tone */
        power = BlockCorrelate(nSamps, gDelayLineWritePtr,
                                        gDelayLineWritePtr);
        if (power > kMinPower)
            {
            corr1 = BlockCorrelate(nSamps, gDelayLineWritePtr,
                                            gDelayLineWritePtr -
                                            gPeriodGap);
            corr2 = BlockCorrelate(nSamps, gDelayLineWritePtr,
                                            gDelayLineWritePtr -
                                            gHalfPeriodGap);
            power = (power >> 2);
            if ((corr1 >= power) && (corr2 <= -power))
                {
                if (++gDetectCount == gDetectorSensitivity)
                    {
                    modemStatusStruct   status;
                    status.code = kCallWaitingToneDetected;
                    DataModemStatusHandler(&status);
                    }
                }
            else
                gDetectCount = 0;
            }
        else
            gDetectCount = 0;
        BlockShortMove(kCallWaitingMaxDelay, gDelayLine+nSamps,
                       gDelayLine);
        }
    }
```

In the exemplary source code above, threshold$_1$ and threshold$_2$ are both 25% (power=(power>>2)) and gDetectorSensitivity (or N$_3$) is set to eight (8) consecutive blocks to guard against false detections. Other threshold values and consecutive block counts are also suitable and will depend on relative near-end echo level.

Although in an exemplary embodiment (see FIG. 3), call-waiting tone detector 399 is positioned to receive sample data at the front end receive path structures 302, alternative embodiments may position a call-waiting tone detector after echo cancellation in the modem front-end data path, e.g., at the input of automatic gain control 389, at the output of automatic gain control 389, or elsewhere downstream of echo cancellation. Such embodiments may obviate the bandpass filtering of call-waiting tone detector 399, at least during when a then current modulation scheme includes echo cancellation. Based on the description herein, suitable modifications to include bandpass filtering or alternative near-end echo suppression, e.g., selectively during V.22 modulation, will be appreciated by those skilled in the art.

An Exemplary Software Modem Embodiment

FIG. 3 depicts transmit path structures 301 and receive path structures 302 for an exemplary V.34 modem 120 embodiment, including call-waiting tone detector 399. Transmit path structures 301 and receive path structures 302 include fixed and adaptive filter implementations and other signal processing structures for modulation and demodulation of signals in accordance with the signaling requirements of ITU-T Recommendation V.34. In the exemplary embodiment of FIG. 3, filter implementations and other signal processing structures are implemented as software executable on a general purpose processor and call-waiting tone detection is accomplished in software.

Transmit path structures 301 include encoder 320, modulator 330, and pre-emphasis and shaping filter 341. Receive path structures 302 include decoder 360, demodulation and channel impairment compensation module 370, and receive front end module 380.

Those of skill in the art will recognize a variety of suitable software implementations for structures along transmit and receive data paths, including algorithms for both performing the signal processing functions defined by the structures and for adaptively updating the structure definitions, e.g., by adaptively updating filter coefficients. The particular structures depicted in FIG. 3 are merely illustrative of an exemplary set of suitable implementations. Alternative embodiments may incorporate transmit and receive path structures of any suitable design. Such structures, including the call-waiting tone detector described above, may be suitably implemented in custom circuitry, using a programmed custom (or commercially-available) DSP, as software executable on a general purpose processor, or as any combination of the above.

Referring now to the receive data path of V.34 modem 120, receive path structures 302 (i.e., software implementations thereof) for receive front end module 380, demodulation and channel impairment compensation module 370, and decoder 360 are all active (enabled) while V.34 modem 120 is operating in steady state communications state. Receive front end module 380 receives the output of the A/D converter 392 as an input. A/D converter 392 couples to transmission line 395. Preliminary echo canceler 390 is implemented as a real data/real coefficients adaptive filter using any suitable filter implementation. Preliminary echo canceler 390 receives as an input a white signal from the output of the modulator 330. Preliminary echo canceler 390 uses a stochastic gradient updating algorithm for adaptation during half duplex of V.34 training and is not updated during data mode. This preliminary stage of echo cancellation reduces echo level relative to the receive signal level so that subsequent stages such as clock recovery, S and A/B signal detection, and automatic gain control will not be significantly affected by the echo. Alternative embodiments may provide distinct near- and far-end preliminary echo canceler structures.

S signal detector 386 is employed to detect S-to-$\overline{S}$ transitions indicative of rate re-negotiation and cleardown requests as described in ITU-T Recommendation V.34, §§11.6–7 of which are hereby incorporated by reference. Similarly, A/B tone detector 387 is employed to detect tone A (if V.34 modem 120 is the call modem) or tone B (if V.34 modem 120 is the answer modem) indicative of retrain requests as described in ITU-T Recommendation V.34, §11.5 of which is hereby incorporated by reference. Call waiting tone detector 399 is described above.

Receive path structures 302 implemented along the receive data path should be synchronized with the remote modem signal. In the exemplary embodiment of FIG. 3, an adaptive FIR filter is used to perform the interpolation. Adaptive FIR filters are used to interpolate the receive signal (at receive signal interpolator 385) as well as to interpolate delayed and undelayed versions of the modulator output (at far-end echo interpolator 383 and near-end echo interpolator 381) used as inputs for corresponding far- and near-end main echo cancelers 373 and 374. The filter coefficients are adjusted based on timing phase and frequency recovered from the remote modem signal by clock recovery module 384. The adaptation algorithm is performed by a two-stage combination of a poly-phase filter and linear interpolations. Those of skill in the art will appreciate a variety of suitable implementations of poly-phase filters, as well as alternative adaptation algorithms.

Demodulator 372, a corresponding inverse structure (demodulators$^{-1}$ 371), and decoder 360 provide a feedback loop for adaptive updates to the coefficients defining main near-end echo canceler 373, main far-end echo canceler 374, and equalizer 375. V.34 modem 120 may optionally include a phase locked loop to compensate for frequency offset and phase jitter on transmission line 395. Regarding demodulation and channel impairment compensation module 370, a variety of alternative echo canceler and equalizer configurations are suitable. Several such configurations are described in greater detail in a co-pending patent application Ser. No. 08/761,405 entitled, "SYSTEM AND METHOD FOR IMPROVING CONVERGENCE DURING MODEM TRAINING AND REDUCING COMPUTATIONAL LOAD DURING STEADY-STATE MODEM OPERATIONS," naming Gonikberg and Liang as inventors and filed on Dec. 6, 1996, the entirety of which is hereby incorporated by reference.

Decoder 360 converts the demodulated complex symbols into a bit stream which is supplied to receiver process 397. Transmit process 396 and receiver process 397 may be the same process. Decoder 360 performs nonlinear decoding, linear prediction, trellis decoding, constellation decoding, shell demapping, and data deframing, all as described in respective sections of the V.34 recommendation, which is incorporated herein by reference. Those of skill in the art will recognize variety of alternative implementations of decoder 360 in accordance with the requirements the V.34 recommendation. In addition, those of skill in the art will recognize a variety of alternative configurations of decoder 360 suitable to modem implementations in accordance with other communications standards such as V.32, V.32bis, etc.

Referring now to the transmit data path of V.34 modem 120, transmit process 396 supplies a bit stream to a V.34 implementation of encoder 320. Encoder 320 converts the input bit stream into a baseband sequence of complex symbols which is used as input to modulator 330. Encoder 320 performs shell mapping, differential encoding, constellation mapping, precoding and 4D trellis encoding, and nonlinear encoding, all as described in respective sections of ITU-T Recommendation V.34, §§9.1–9.7 of which are hereby incorporated by reference.

Modulator 330 converts the baseband sequence of complex symbols from the output of the encoder into a passband sequence of real samples. In particular, modulator 330:

1. multiplies the complex baseband sequence by the carrier frequency; and
2. converts the complex signal to real.

If the spectrum of the modulator output is sufficiently white, it can be used as an input to receiver echo cancelers, as described below.

Shaping and pre-emphasis filter 341 provides square-root-of-raised-cosine shaping as well as pre-emphasis filtering specified by section 5.4 of the V.34 recommendation, which is incorporated herein by reference. Square-root raised cosine complex shaping and pre-emphasis filtering are implemented using any suitable filter implementation. The output of shaping and pre-emphasis filter 341 is an output of the transmitter portion of V.34 modem 120 and is provided to D/A converter 391. D/A converter 391 couples to transmission line 395.

In one embodiment of V.34 modem 120, portions of the receive path may be disabled during a doze mode. Operation of such an embodiment, including transitions between steady state communications state and doze state are described in greater detail in a co-pending patent application Ser. No. 08/780,611 entitled, "SYSTEM AND METHOD FOR REDUCING PROCESSING REQUIREMENTS OF MODEM DURING IDLE RECEIVE TIME," naming Zarko Draganic as inventor and filed on Jan. 8, 1997, the entirety of which is hereby incorporated by reference. In such an embodiment, inclusion of call-waiting tone detector 399 in the set of undisabled receive path structures active during a doze state advantageously allows detection of an incoming call even during idle receive time. Because, call-waiting tone detection can be performed as described above by performing correlations on subsets of the received samples for a given block, call-waiting tone detector 399 consumes few processor cycles and does not significantly affect processor load during doze mode.

Exemplary Device Embodiments

Figure 5:
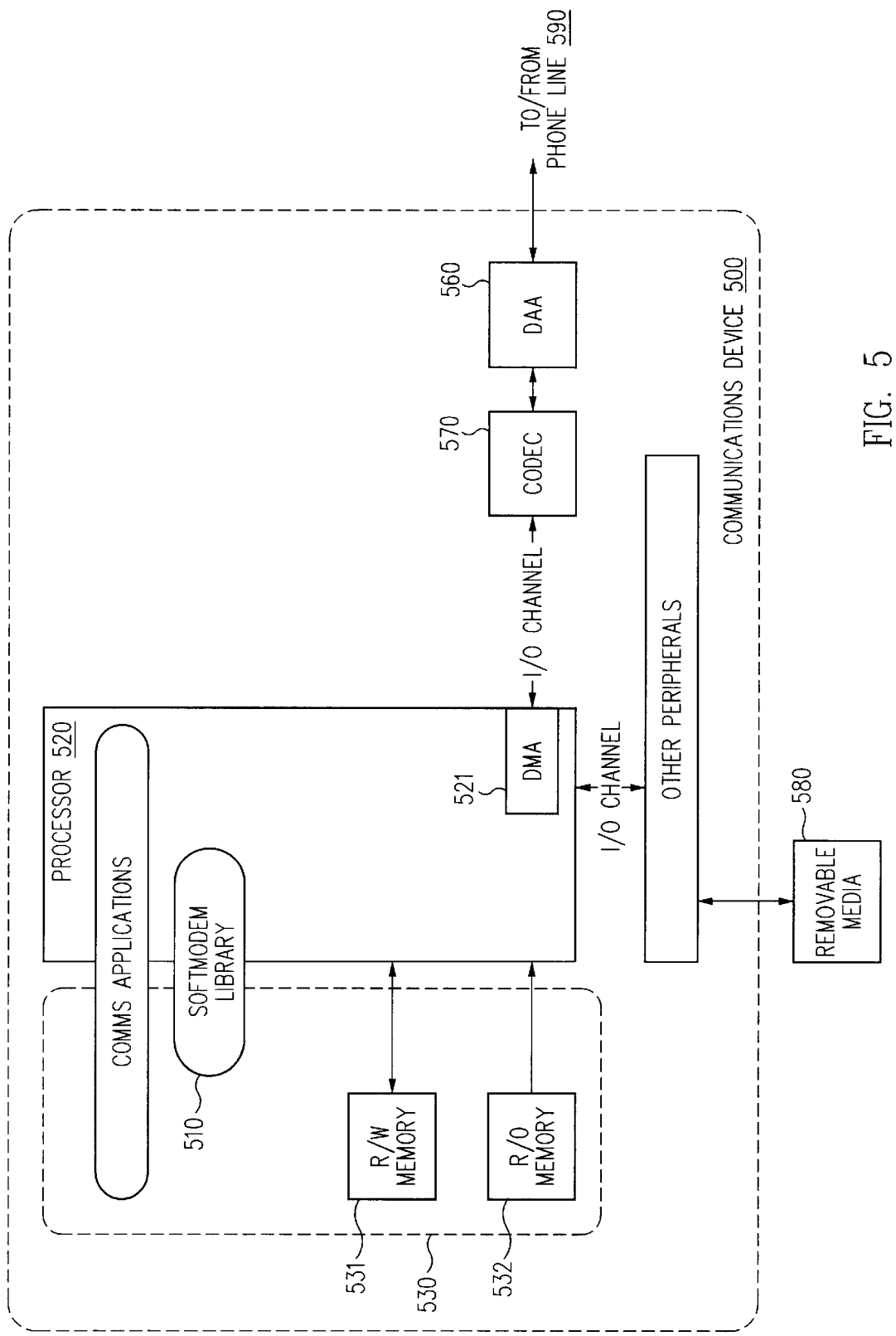
FIG. 5 is a block diagram of an exemplary communications device embodiment including a processor, and memory for executing a software implementation of a modem including a call-waiting tone detector such as that depicted in FIG. 3.

FIG. 5 depicts a communications device 500 incorporating executable code of a SoftModem library 510 including modules providing a software implementation of a V.34 modem 120. In a such an embodiment, input signal vectors (e.g., samples y(n)) and threshold values, as well as filter coefficient vectors suitable for providing the various filter implementations of interpolators, phase splitting filters, linear predictors, etc. are loaded from memory 530. Output signal vectors are stored to memory 530. In addition, executable instructions implementing the SoftModem library 510 (including implementations of transmit path structures 301 and receive path structures 302) and suitable for execution on general purpose processor 520 are also stored in, and loaded from, memory 530. Alternative embodiments may include executable instructions and predetermined values, e.g., thresholds, in a non-volatile or read-only store.

In an exemplary embodiment, general purpose processor 520 includes a MIPS R3000 RISC microprocessor, although a wide variety of alternative processor implementations are also suitable, including, for example, R4000 and R5000 processors, processors conforming to the StrongArm™, Sparc™, PowerPC™, Alpha™, PA-RISC™, or x86 processor architectures, etc. General purpose processor 520 includes a DMA channel 521 for interfacing to telecommunication circuits (illustratively, phone line 590) via codec 570 and Digital-to-Analog/ Analog-to-Digital (DAA) converter 560. Of course, memory 530 may include either read/write memory 531 or read/write memory 531 in combination with read-only memory 532. Persons of ordinary skill in the art will recognize a variety of suitable allocations of code and data to each. Removable media 580 provides a mechanism for supplying the executable instructions implementing SoftModem library 510.

While the invention has been described with reference to various embodiments, it will be understood that these embodiments are illustrative and that the scope of the invention is not limited to them. For example, call waiting tone detection may be performed at a variety of points in the signal processing structure of a given implementation. Software, hardware, and hardware/software embodiments are all envisioned. Although described in the context of an exemplary software embodiment of a V.34 modem, call waiting tone detectors in accordance with the present invention may be employed in a wide variety of communications device applications including set top boxes, internet terminal devices, satellite/pay TV authorization devices, fax machines, Personal Digital Assistants (PDAs), portable computers, cellular phones, etc. with suitable modifications to the surrounding signal processing structures. Many variations, modifications, additions, and improvements of the embodiments described are possible and may fall within the scope of the invention as defined by the claims which follow.

What is claimed is:

1. A method of detecting a call-waiting tone in a signal, said method comprising:
    sampling the signal to form a first sequence including a plurality of signal samples;
    cross-correlating said first sequence with a second sequence to form a first cross-correlation value, said second sequence being derived from said first sequence and temporally displaced by a first lag therefrom;
    cross-correlating said first sequence with a third sequence to form a second cross-correlation value, said third sequence being derived from said first sequence and temporally displaced by a second lag therefrom; and
    identifying said call-waiting tone in said signal by comparing said first cross-correlation value with a first threshold percentage of a signal power value for said first sequence and by comparing said second cross-correlation value with a second threshold percentage of said signal power value.

2. The method of claim 1 further comprising:
    at least partially canceling near end echo components in said first sequence prior to said cross-correlating to form said first and said second cross-correlation values.

3. The method of claim 1 further comprising signaling an incoming call in response to said identifying.

4. The method of claim 1
    wherein said first lag is an first integer number of samples corresponding to a second integer number of periods of said call-waiting tone; and
    wherein said second lag is an third integer number of samples corresponding to a half-integer number of periods of said call-waiting tone.

5. The method of claim 1
wherein said first lag is a first minimal integer number of samples, at a current sampling rate, corresponding to an integer multiple of the period of said call-waiting tone; and
wherein said second lag is a second minimal integer number of samples, at said current sampling rate, corresponding to a half integer multiple of said period of said call-waiting tone.

6. The method of claim 1 wherein said call-waiting tone is a 440 Hz tone.

7. The method of claim 1 performed only once per block of said signal samples.

8. The method of claim 1
further comprising auto-correlating said first sequence to determine said signal power value, and
wherein the identifying said call-waiting tone further includes comparing said signal power value with a threshold power level.

9. The method of claim 8 further comprising:
at least partially canceling near end echo components in said first sequence prior to said auto-correlating.

10. The method of claim 8 further comprising:
bandpass filtering said first sequence to at least partially cancel near end echo components in said first sequence.

11. The method of claim 8 wherein said threshold power level is selected to discriminate between a first received signal possibly including a call-waiting tone component in addition to a local transmit energy component and a second received signal not including said call-waiting tone component.

12. The method of claim 8 wherein said threshold power level is approximately −30 dBm.

13. The method of claim 8 wherein said threshold power level between approximately −20 dBm and approximately −43 dBm.

14. The method of claim 8 wherein said threshold power level is greater than an echo-suppressed near-end echo level but less than an expected call-waiting tone level.

15. The method of claim 8 wherein said threshold power level is selected to discriminate between an expected power level of the call-waiting tone and a power level of noise and echo.

16. The method of claim 1 wherein said first and said second threshold percentages are selected from approximately 20% to approximately 75% of said signal power.

17. The method of claim 1 wherein said first and said second threshold percentages are approximately 25% of said signal power.

18. The method of claim 1 wherein said first and said second threshold percentages are approximately equal.

19. The method of claim 1 further comprising:
autocorrelating said first sequence to determine said signal power value;
determining whether said signal power value exceeds a threshold power level of approximately −30 dBm, and, if so, whether said first cross-correlation value exceeds approximately 20% to 75% of said signal power value, and, if so, whether the additive inverse said second cross-correlation value exceeds approximately 20% to 75% of said signal power value; and
if the preceding determinations are all affirmative, supplying a human perceivable incoming call indication.

20. The method of claim 1 wherein said first lag approximates an integer multiple of said call-waiting tone period and said second lag approximates a half integer multiple of said call-waiting tone period.

21. The method of claim 1 encoded in a computer readable medium as instructions executable on a processor, said computer readable medium selected from a set of media including magnetic storage media, optical storage media, and communications media conveying signals encoding said instructions.

22. An apparatus comprising:
a signal sampler coupled to receive a signal from a communications medium and to form a sampled sequence of values corresponding to said signal; and
a call-waiting tone detector coupled to operate on a stored representation of a first sequence corresponding to said sampled sequence, said call-waiting tone detector including:
a first correlator having access to said stored representation to calculate a power value of said signal;
a second correlator having access to said stored representation to cross-correlate said stored representation with a first temporal displacement thereof to produce a first cross-correlation value;
a third correlator having access to said stored representation to cross-correlate said stored representation with a second temporal displacement thereof to produce a second cross-correlation value; and
decision logic responsive to said first, said second, and said third correlators, said decision logic signaling detection of a call waiting tone:
if said power value exceeds a threshold power level, and
if said first cross-correlation value exceeds a first threshold percentage of said power value, and,
if the additive inverse of said second cross-correlation value exceeds a second threshold percentage of said power value;
wherein said first and said second temporal displacements are each by integer numbers of samples, wherein said first temporal displacement corresponds to an integer multiple of the period of a call-waiting tone, and wherein said second temporal displacement corresponds to a half-integer multiple of the period of said call-waiting tone.

23. An apparatus as in claim 22 wherein said signal sampler includes an analog to digital converter.

24. An apparatus as in claim 22
wherein said apparatus includes a processor;
wherein said stored representation is represented in storage accessible instructions executing on said processor; and
wherein said first correlator, said second correlator, said third correlator, and said decision logic each comprise instructions executable on said processor.

25. An apparatus as in claim 22 wherein said call-waiting tone detector provides bandpass filtering to suppress near-end echo from the first sequence.

26. An apparatus as in claim 22 further comprising:
an echo canceler for at least partially canceling near end echo from the first sequence;
wherein said call-waiting tone detector is coupled to operate on the first sequence without echo cancellation by said echo canceler.

27. An apparatus as in claim 22 further comprising:
an echo cancellation node coupled between said signal sampler and said call-waiting tone detector such that, in said first sequence, near-end echo is at least partially canceled from the sampled sequence.

28. An apparatus as in claim 22 coupled into a line input path of a communications device including incoming call indication means, said communications device being selected from a set of devices including modem, a set-top box, a personal digital assistant, a mobile or cellular phone, a telephony device, and a computer system.

29. An apparatus as in claim 22 encoded in a computer readable medium as software executable on a processor.

30. A method comprising:
   establishing a connection between a first modem and a second modem;
   communicating data between the first modem and the second modem using a signal;
   detecting a tone in the signal received at the first modem by:
      sampling the signal to form a first sequence, the sequence including a plurality of signal samples;
      cross-correlating the first sequence with a second sequence to form a first cross-correlation value;
      cross-correlating the first sequence with a third sequence to form a second cross-correlation value; and
      identifying the tone by comparing the first cross-correlation value with a first threshold value and comparing the second cross-correlation value with a second threshold value; and
   indicating that the tone is detected.

31. The method of claim 30 wherein the tone includes a call-waiting tone.

32. The method of claim 30
   wherein the tone includes a call-waiting tone, and
   further comprising suspending the communication of data between the first modem and the second modem in response to the indication that the call-waiting tone is detected.

33. The method of claim 30 wherein at least the first modem is implemented as software executable on a processor.

34. A modem comprising:
   transmit path structures including an encoder and a modulator; and
   receive path structures including a decoder, a demodulator, and a call-waiting tone detector having:
      a correlation structure capable of correlating a received signal with itself, with a first derived signal, and with a second derived signal to produce a plurality of correlation values, the first and second derived signals being derived from the received signal; and
      a comparator for comparing at one of the plurality of correlation values with a first threshold value and for comparing another of the plurality of correlation values with a second threshold value.

35. The modem of claim 34 wherein the call-waiting tone detector includes a band pass filter to suppress near-end echo in the received signal.

36. The modem of claim 34 wherein the transmit and receive path structures are implemented as software executable on a processor.

37. The modem of claim 34 wherein the call-waiting tone-detector is implemented as software executable on a processor.

38. The modem of claim 34 wherein the call-waiting tone detector supplies a call-waiting tone detect signal.

39. The modem of claim 34
   wherein the transmit and receive path structures are implemented as software executable on a processor; and
   wherein the call-waiting tone detector supplies a software indication to signal an incoming call to user interface software also executable on said processor.

40. The modem of claim 39 wherein said software indication includes one of a function, procedure or method return value, a flag or register value, and selective invocation of program code.

* * * * *